June 5, 1923.                D. GARLATTI                1,458,046
                         COMBINATION INSTRUMENT
                          Filed Dec. 6, 1921              2 Sheets-Sheet 1
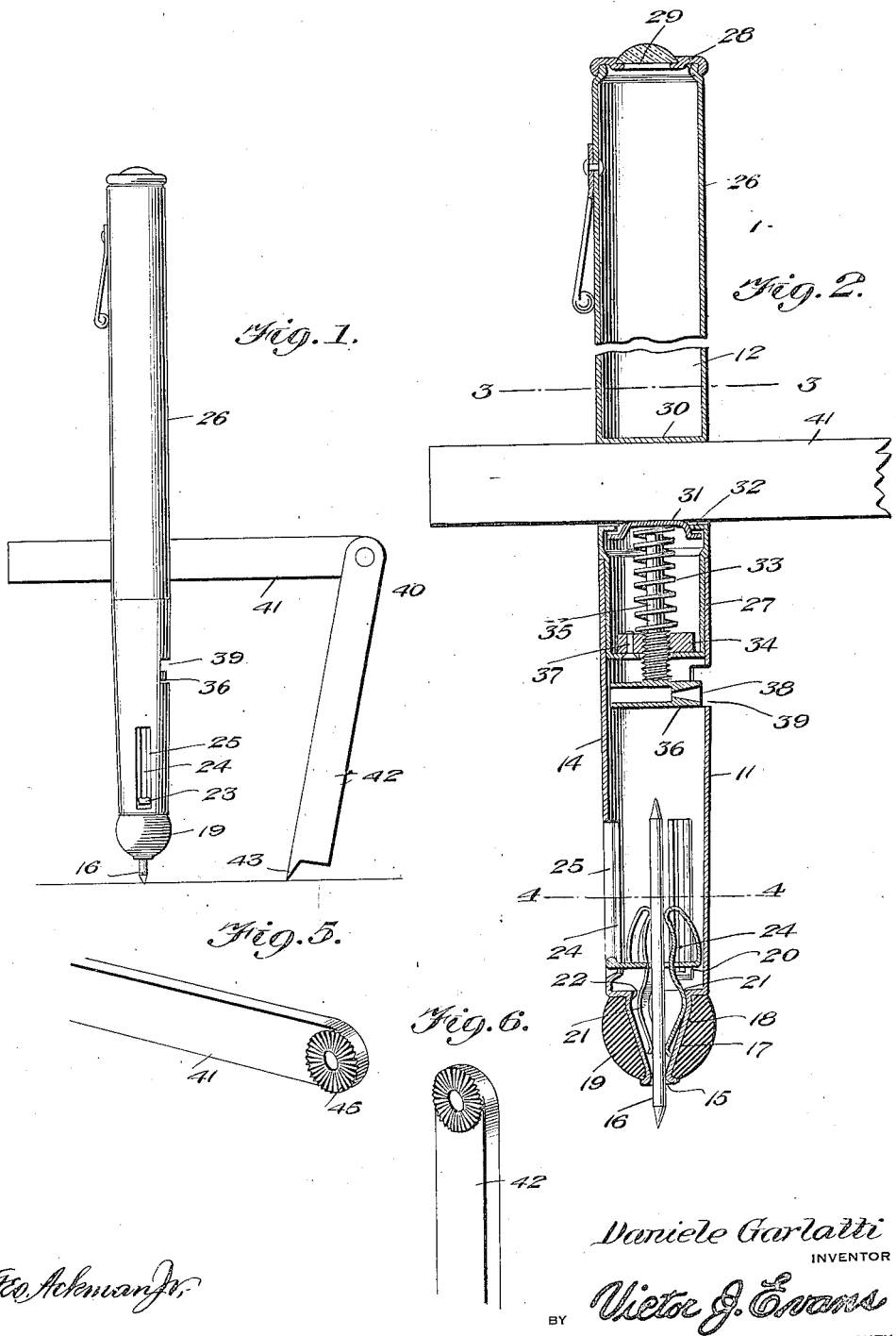
Daniele Garlatti
INVENTOR
BY Victor J. Evans
ATTORNEY June 5, 1923.
D. GARLATTI
COMBINATION INSTRUMENT
Filed Dec. 6, 1921
1,458,046
2 Sheets-Sheet 2
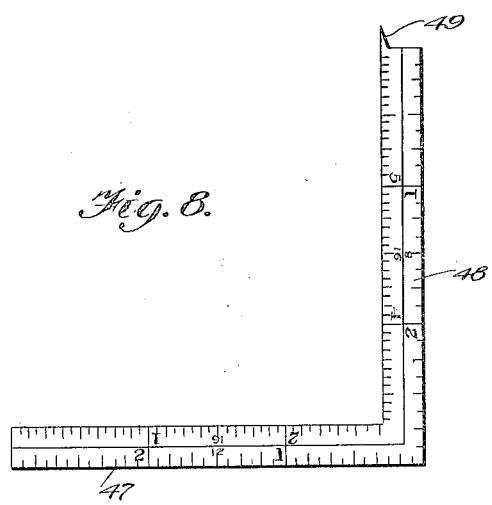
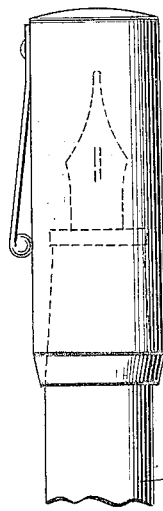
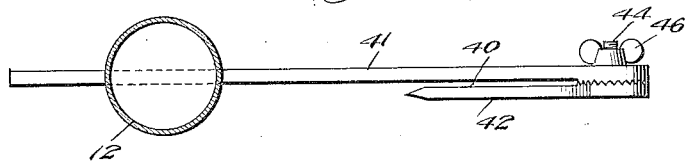
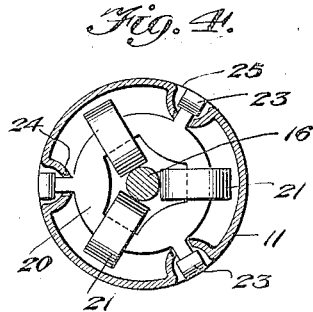
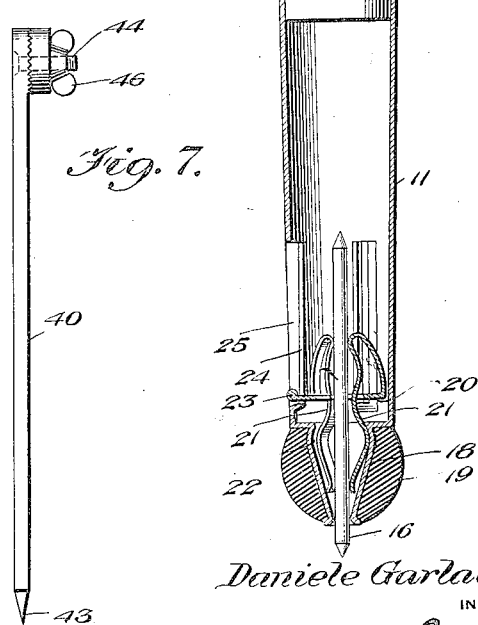
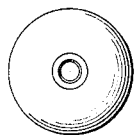
Daniele Garlatti
INVENTOR
BY Victor J. Evans
ATTORNEY
WITNESS:

Patented June 5, 1923.

1,458,046

UNITED STATES PATENT OFFICE.

DANIELE GARLATTI, OF IROQUOIS FALLS, ONTARIO, CANADA.

COMBINATION INSTRUMENT.

Application filed December 6, 1921. Serial No. 520,375.

*To all whom it may concern:*

Be it known that I, DANIELE GARLATTI, a subject of the King of Italy, residing at Iroquois Falls, in the Province of Ontario and Dominion of Canada, have invented new and useful Improvements in Combination Instruments, of which the following is a specification.

This invention relates to combination instruments, such as pens, pencils, compasses and calipers, an object of the invention being to provide an instrument which is capable of all of the foregoing uses.

Another object of the invention is the provision of an instrument which may be arranged as a combined fountain pen and pencil, or which may be converted into a pair of compasses or calipers, by the removal of the pen unit and the attachment of a substitute unit which is designed to carry either a compass attachment or a caliper attachment.

Another object of the invention is the provision of an instrument as above stated, which is simple and durable of construction and which may be easily and quickly converted into any of the various instruments above mentioned, so as to impart a wide range of utility.

With the above and other objects in view, the invention further includes the following novel features and details of construction, to be hereinafter more fully described, illustrated in the accompanying drawings and pointed out in the appended claims.

In the drawings:—

Figure 1 is an elevation of a combination instrument embodying the invention and shown arranged as a compass.

Figure 2 is a vertical sectional view of the same with the compass bar broken away.

Figure 3 is an enlarged transverse section on the line 3—3 of Figure 2 but illustrating the compass bar and its leg.

Figure 4 is a section on the line 4—4 of Figure 2.

Figures 5 and 6 are detail views showing the form of connection between the beam and leg of the compass attachment.

Figure 7 is an edge view showing the compass beam and bar connected.

Figure 8 is an elevation of the caliper attachment.

Figure 9 is a sectional view showing the pencil unit secured to an ordinary fountain pen.

Figure 10 is a view looking at the pencil end of the instrument.

Referring in detail to the drawings, wherein like characters of reference denote corresponding parts, the instrument which is designed for a number of various uses, such as a pencil, pen, compass and caliper, is shown as including a pencil unit 11, a beam carrying unit 12 and a pen unit 13.

The pencil unit 11 is shown as being formed of a hollow tubular casing 14, whose lower end is provided with an opening 15 for the passage of a lead 16. The opening 15 is arranged at the outer end of a substantially conical extension 17, whose inner end or base is of less diameter than the adjacent end of the casing 14 so as to provide a seat 18 for a rubber annulus or eraser.

The lead 16 is clamped in place by means of a gripping member which includes a plate 20 having spring arms 21 connected thereto. The extremities of these arms engage the lead 16 upon opposite sides of the plate 20 and the outer ends of these spring arms 21 yieldingly engage an annular shoulder 22 located at the inner end or base of the conical extension 17, so that the pressure of writing will not accidentally force the lead inward. The lead may however, be moved inward when desired through the medium of knobs 23, whose shanks extend through guide openings 24 provided in the casing 14, the said shanks being attached to or forming a part of the plate 20. By this means the lead gripping member may be moved longitudinally of the pencil and the lead projected or retracted as desired. It is preferred to arrange the knobs 23 within longitudinally disposed grooves 25 formed in the casing 14, so that the said knobs will not extend beyond the periphery of the casing.

The opposite end of the casing 14 is open and is designed to be closed through the medium of either the beam carrying unit or the pen unit. The former, that is, the beam carrying unit is shown as comprising a hollow tubular casing 26, which is closed at each end. One end of this casing is reduced as shown at 27 so as to provide a slip joint engagement with the open end of the pencil casing 14. The opposite end of the casing 26 is provided with a removable closure 28, having a glass covered sight opening 29 therein. As the beam carrying unit 12 is designed to provide means for the attachment of a compass or caliper, the closure 28 is made removable whereby the compass or the caliper attachments may be removably received within the casing.

The casing 26 is provided with a transversely arranged opening 30 and normally projecting into this opening is a plate 31. The edge of this plate is adapted to engage a flange 32 so as to limit the movement of the plate within the opening. This plate is designed to frictionally engage the beam of either a compass attachment or a caliper attachment, to be later described. The plate 31 is yieldingly projected within the opening 30 by means of a spring 33, one end of which bears against the plate and the opposite end against a nut 34. This nut is located within the inner end of the casing 26 and is provided with a threaded opening for engagement with the threads of a stem 35. This stem is provided with a head 36 by means of which the stem may be rotated, the purpose being to adjust the nut to regulate the tension of the springs 33. Rotation of the nut is prevented by means of a pin 37 which is carried by the end of the casing 12 and which enters an opening in the nut 34. The head 36 is provided with an opening 38 for the reception of a pointed instrument, which may be inserted through an opening 39 provided in the casing 14 of the pencil unit 11, whereby adjustment of the spring may be effected. This opening preferably extends entirely through the head.

The compass attachment which is indicated at 40, includes a beam 41 and a leg 42, which are pivotally connected together, the latter being provided with a pointed extremity 43. As illustrated in Figures 1 and 2 of the drawings, the beam 41 is inserted through the opening 30 and held in adjusted position within said opening through the medium of the yieldingly mounted plate 31. The pivotal connection between the beam 41 and the leg 42 is such as to permit of relative adjustment in a manner to prevent accidental pivotal movement and for this purpose the pivotal connection of the beam which is shown as a bolt 44, is surrounded by opposed teeth or serrations 45. A thumb nut 46 engages the threaded end of the bolt 44 so as to hold the parts in adjusted position.

The caliper attachment is illustrated in Figure 8 of the drawings and includes a beam 47, to which is rigidly connected a leg 48, one end of the latter being provided with a pointed extremity 49. The caliper attachment is preferably graduated as shown. It is apparent that the compass attachment may be removed and the caliper attachment substituted when desired.

The pen unit 13 may be of any desirable construction, being herein shown as an ordinary fountain pen, which includes a tapered end 50 capable of having a slip joint engagement with the open end of the pencil unit 11, as illustrated in Figure 9 of the drawings.

The invention is susceptible of various changes in its form, proportions and minor details of construction and the right is herein reserved to make such changes as properly fall within the scope of the appended claims.

Having described the invention what is claimed is:—

1. A combination instrument embodying a pencil unit, a beam carrying unit, means whereby a compass or caliper beam may be adjustably secured to the beam carrying unit and means for removably securing the pencil and beam carrying units together.

2. A combination instrument embodying a pencil unit, a beam carrying unit having a transversely arranged beam receiving opening therethrough, means located within the beam carrying unit for adjustable engagement with a compass or caliper beam and means for removably securing the pencil and beam carrying units together.

3. A combination instrument embodying a pencil unit, a beam carrying unit having a transversely arranged beam receiving opening therethrough, yieldable means arranged within the beam carrying unit for engagement with a compass or caliper beam and means for removably securing the pencil and beam carrying units together.

4. A combination instrument embodying a pencil unit, a beam carrying unit having a transversely arranged beam receiving opening therethrough, means located within the beam carrying unit for frictional engagement with a compass or caliper beam and means for removably securing the pencil and beam carrying units together.

5. A combination instrument embodying a pencil unit, a beam carrying unit having a transversely arranged beam receiving opening therethrough, means located within the beam carrying unit for frictional engagement with a compass or caliper beam, means for regulating such frictional engagement and means for removably securing the pencil and beam carrying units together.

6. A combination instrument embodying a pencil unit, a beam carrying unit having a transversely arranged beam receiving opening therethrough, a plate extending within the opening for engagement with a compass or caliper boom, a spring for yieldingly holding the plate in position, means whereby the tension of the spring may be regulated and means for removably securing the pencil and beam carrying units together.

7. A combination instrument embodying a pencil unit, a beam carrying unit removably secured thereto and means for removably and adjustably securing a beam to the beam carrying unit.

In testimony whereof I affix my signature.

DANIELE GARLATTI.